US012748421B2

(12) United States Patent
Fallon et al.

(10) Patent No.: US 12,748,421 B2
(45) Date of Patent: Sep. 29, 2026

(54) AGRICULTURAL SYSTEM AND METHOD FOR MANAGING A FLEET OF AGRICULTURAL WORK VEHICLES

(71) Applicant: CNH Industrial America LLC, New Holland, PA (US)

(72) Inventors: Derrick Fallon, Manitowoc, WI (US); Mitchell Sandey, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 258 days.

(21) Appl. No.: 18/217,031

(22) Filed: Jun. 30, 2023

(65) Prior Publication Data

US 2025/0004467 A1 Jan. 2, 2025

(51) Int. Cl.
*G05D 1/00* (2024.01)
*G06F 21/31* (2013.01)

(52) U.S. Cl.
CPC ........... *G05D 1/0027* (2013.01); *G06F 21/31* (2013.01)

(58) Field of Classification Search
CPC .................. G05D 1/0027; G06F 21/31; G06Q 10/063112; G06Q 10/06316
See application file for complete search history.

(56) References Cited

U.S. PATENT DOCUMENTS

| | | | | |
|---|---|---|---|---|
| 6,963,794 B2 | 11/2005 | Geber et al. | | |
| 8,350,670 B2 | 1/2013 | Kelly et al. | | |
| 10,369,964 B2 | 8/2019 | Woodill et al. | | |
| 2009/0099898 A1* | 4/2009 | Ehrman | G06Q 10/06 | 705/7.15 |
| 2011/0160994 A1* | 6/2011 | Schmidt | A01B 79/005 | 707/740 |
| 2014/0277905 A1* | 9/2014 | Anderson | G06Q 10/063114 | 701/29.3 |
| 2014/0278608 A1* | 9/2014 | Johnson | G06Q 50/40 | 705/5 |
| 2020/0090107 A1* | 3/2020 | Mckeeman | G06Q 10/063112 | |
| 2020/0193356 A1* | 6/2020 | Moreno | G06Q 10/063112 | |
| 2023/0305568 A1* | 9/2023 | Telpaz | B60L 53/64 | |

FOREIGN PATENT DOCUMENTS

| | | | |
|---|---|---|---|
| DE | 102019207144 A1 * | 11/2020 | |
| WO | WO-2013045837 A1 * | 4/2013 | G06Q 10/06 |

OTHER PUBLICATIONS

Machine translation of WO-2013045837-A1 (Year: 2013).*
Machine translation of DE-102019207144-A1 (Year: 2020).*

* cited by examiner

*Primary Examiner* — Navid Z. Mehdizadeh
*Assistant Examiner* — Caitlin R Mccleary
(74) *Attorney, Agent, or Firm* — Dority & Manning, P.A.

(57) ABSTRACT

A system for managing a fleet of agricultural vehicles includes a first work vehicle, a second work vehicle, and a computing system. The computing system receives an input assigning the first work vehicle to a first work task, an input assigning the second work vehicle to the first work task, and an input assigning a first operator to the first work task. Moreover, the computing system grants the first operator an ability to access the first work vehicle in response to receiving the inputs assigning the first work vehicle and the first operator to the first work task. Similarly, the computing system grants the first operator an ability to access the second work vehicle in response to receiving the inputs assigning the second work vehicle and the first operator to the first work task.

20 Claims, 8 Drawing Sheets

AGRICULTURAL SYSTEM AND METHOD FOR MANAGING A FLEET OF AGRICULTURAL WORK VEHICLES

FIELD OF THE INVENTION

The present disclosure relates generally to agricultural operations and, more particularly, to systems and methods for managing a fleet of agricultural work vehicles that perform agricultural operations.

BACKGROUND OF THE INVENTION

Large agricultural fleets can operate hundreds of vehicles and manage operations spanning vast amounts of land. In various instances, a centralized control unit may be used to monitor the operation of the large number of vehicles. However, it is often difficult to manage selective access for individuals to enter and/or operate vehicles of the fleet. Typically, designated physical keys for each vehicle are the only way to enter and/or operate vehicles of the fleet. As such, the physical keys must physically be transferred between operators, which may be inconvenient, particularly if a key is lost, and may lead to security issues if the keys are left in the vehicles.

Accordingly, an improved agricultural system and method for managing a fleet of agricultural work vehicles would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for managing a fleet of agricultural vehicles. The system may include a first work vehicle, a second work vehicle, and a computing system communicatively coupled with the first and second work vehicles. The computing system may be configured to receive an input assigning the first work vehicle to a first work task, receive an input assigning the second work vehicle to the first work task, and receive an input assigning a first operator to the first work task. Moreover, the computing system may be configured to grant the first operator an ability to access the first work vehicle in response to receiving the input assigning the first work vehicle to the first work task and the input assigning the first operator to the first work task. Similarly, the computing system may be configured to grant the first operator an ability to access the second work vehicle in response to receiving the input assigning the second work vehicle to the first work task and the input assigning the first operator to the first work task.

In another aspect, the present subject matter is directed to a method for managing a fleet of agricultural vehicles. The method may include receiving, by a computing system, an input assigning a first work vehicle of a fleet of agricultural vehicles to a first work task. Similarly, the method may include receiving, by the computing system, an input assigning a second work vehicle of the fleet of agricultural vehicles to the first work task. Further, the method may include receiving, by the computing system, an input assigning a first operator to the first work task. Moreover, the method may include granting, by the computing system, the first operator an ability to access the first work vehicle in response to receiving the input assigning the first work vehicle to the first work task and the input assigning the first operator to the first work task. Additionally, the method may similarly include granting, by the computing system, the first operator an ability to access the second work vehicle in response to receiving the input assigning the second work vehicle to the first work task and the input assigning the first operator to the first work task.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
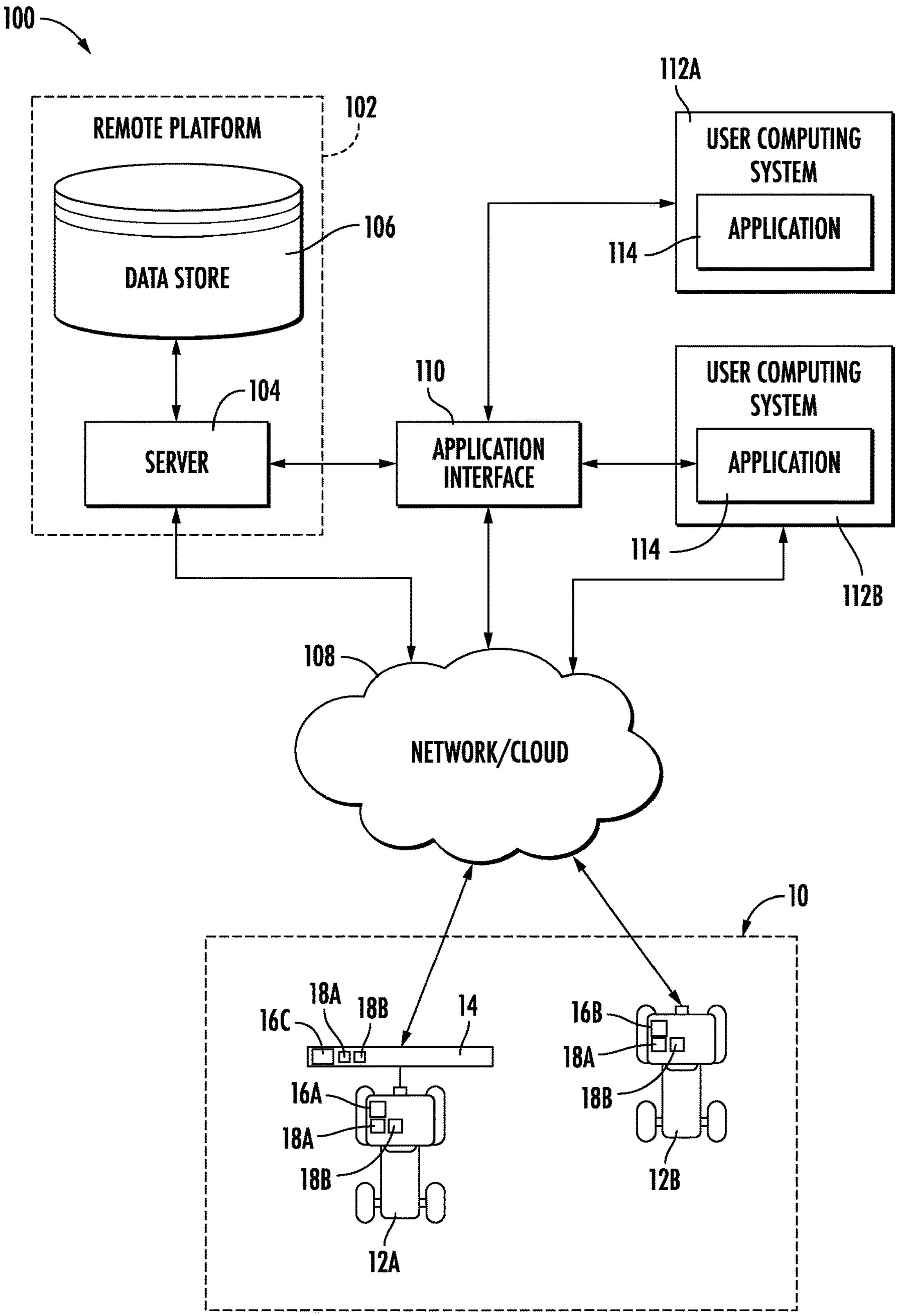
FIG. 1 illustrates a simplified, schematic view of an agricultural vehicle fleet operation system in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed.

In general, the present subject matter is directed to agricultural systems and methods for managing a fleet of agricultural work vehicles. Specifically, in several embodiments, a computing system may be in communication with a fleet of agricultural work vehicles having at least one agricultural work vehicle. The computing system may be configured to receive inputs assigning at least one of the agricultural fleet work vehicles to a work task and assigning at least one operator to the same work task, then provide or grant to each of the at least one operator assigned to the work task ability to access each of the at least one of the agricultural work vehicles assigned to the work task. As such, each of the assigned operators may access any necessary work vehicle needed for the work task, without requiring a dedicated physical key for each work vehicle, which increases flexibility and reduces management time, and thus, improves productivity.

As will be described herein, "access" to an agricultural fleet vehicle may include different access levels, including entry only, entry and only partial operation (e.g., allowing driving, but not performing agricultural operations), or entry and full operation (e.g., allowing driving and performing agricultural operations). For instance, in some embodiments, the computing system may compare credentials of each assigned operator to the credential requirements of each assigned work vehicle and only provide the access level with matching credentials. As such, an operator may be provided full access to some vehicles assigned to a work task, but only be given partial access to other vehicles assigned to the work task, which reduces liability. Further, if an operator is no longer employed, the operator's access to fleet vehicles may be easily revoked by the computing system by removing the operator from tasks. Moreover, access may be provided to an operator by granting access to an operator's identification number, user computing system (e.g., cell phone, fob, and/or the like), and/or the like. Additionally, when an operator is assigned to a work task and/or granted access to fleet work vehicle(s), the computing system may provide a notification to the user (e.g., via the user's computing device).

Referring now to drawings, FIG. 1 illustrates a simplified, schematic view of an agricultural vehicle fleet operation system in accordance with aspects of the present subject matter. For instance, in the illustrated example, a fleet of agricultural vehicles 10 may include one or more agricultural work vehicles, such as a first agricultural work vehicle 12A, a second agricultural work vehicle 12B, and/or the like. The agricultural work vehicles 12A, 12B may be any suitable agricultural work vehicles configured to perform any suitable agricultural operations or connected to one or more suitable implements (e.g., implement 14) configured to perform any suitable agricultural operations. Suitable agricultural operations include, but are not limited to, tilling, seeding, planting, fertilizing, spraying, harvesting, baling, and/or the like. The agricultural vehicles 12A, 12B and, optionally, the implement(s) 14 may each have a computing system (e.g., computing system 16A of the first agricultural work vehicle 12A, computing system 16B of the second agricultural work vehicle 12B, and computing system 16C of the implement 14) for controlling one or more operations of the vehicles 12A, 12B and/or implement 14.

In various examples, the one or more agricultural vehicles 12A, 12B and/or pieces of equipment 14 may be used at one or more work locations (e.g., one or more farms). In some instances, operator cabs and/or other entrance areas (e.g., hoods, trunks, access panels, etc.) of the agricultural vehicles 12A, 12B and/or the implement(s) 14 may be locked or unlocked using any suitable locking devices 18A, such as a keypad, a barcode reader configured to read a barcode (e.g., on an ID badge), a magnetic card reader configured to read a magnetic swipe card, a wireless device reader configured to receive signals from a wireless device (e.g., an electronic key fob, RFID tag, cellphone, etc.), and/or the like, which may be communicatively coupled to the respective computing system 16A, 16B, 16C. In some instances, operation controls of the agricultural work vehicles 12A, 12B and/or the implement(s) 14 (e.g., ignition, implement controls, and/or the like of a user interface) may similarly be locked and unlocked (e.g., turned on and off) using any suitable locking devices 18B, such as a keypad, a barcode reader configured to read a barcode (e.g., on an ID badge), a magnetic card reader configured to read a magnetic swipe card, a wireless device reader configured to receive signals from a wireless device (e.g., an electronic key fob, RFID tag, cellphone, etc.), and/or the like, which may similarly be communicatively coupled to the respective computing system 16A, 16B, 16C.

Each of the computing systems 16A, 16B, 16C of the vehicles 12A, 12B and/or the implement 14 may be in communication with a fleet management system 100. For instance, the fleet management system 100 may include a remote platform computing system 102 that includes remote server 104 communicatively coupled to the computing systems 16A, 16B, 16C of the vehicles 12A, 12B and/or the implement 14 via a network/cloud 108. The remote platform computing system 102 may be configured as any suitable processor-based device, such as a computing device or any suitable combination of computing devices. In several embodiments, the remote platform computing system 102 may include one or more processors and associated memory configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory of the remote platform computing system 102 may generally be configured as memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor, including the set of output data and/or the set of defined data that can be retrieved, manipulated, created, and/or stored by the processor and instructions that can be executed by the processor, when implemented by the processor, configure the remote platform computing system 102 to perform various computer-implemented functions, such as one or more aspects of the image processing algorithms and/or related methods described herein. In addition, the remote platform computing system 102 may also include various other suitable components, such as a communications circuit or module, one or more input/output channels, a data/control bus, and/or the like.

The network/cloud 108 represents one or more systems by which the computing systems 16A, 16B, 16C of the vehicles 12A, 12B and/or the implement 14 may be in communication with the remote platform computing system 102. The network/cloud 108 may be one or more of various wired or wireless communication mechanisms, including any desired combination of wired and/or wireless communication mechanisms and any desired network topology (or topologies when multiple communication mechanisms are utilized). Exemplary communication networks include wireless communication networks (e.g., using Bluetooth, IEEE 802.11, etc.), local area networks (LAN), and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations, when the precise location or interrelation of Internet resources is generally illustrated, extended networks such as the Internet are often depicted as a cloud (e.g. cloud 108 in FIG. 1). The verbal image has been formalized in the newer concept of cloud computing. The National Institute of Standards and Technology (NIST) defines cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not exactly the same, these terms are generally used interchangeably herein, and they may be referred to collectively as the network/cloud 108.

The server 104 may be one or more computer servers, each of which may include at least one processor and at least one memory, the memory storing instructions executable by the processor, including instructions for carrying out various steps and processes. The server 104 may include or be communicatively coupled to a data store 106 for storing the set of output data, the set of machine data, and/or the set of defined data as well as for instructions for the vehicle(s) 12A, 12B and/or the implement 14 with or without intervention from a user. Moreover, the server 104 may be capable of analyzing initial or raw data received from the vehicle(s) 12A, 12B and/or the implement 14 and final or post-processing data (as well as any intermediate data created during data processing).

With further reference to FIG. 1, the server 104 also generally implements features that may enable the vehicle(s) 12A, 12B and/or the implement 14 to communicate with one or more applications 114, which may also be implemented by one or more user computing systems (e.g., user computing systems 112A, 112B). In general, the user computing system(s) 112A, 112B may be configured as any suitable processor-based device, such as a computing device or any suitable combination of computing devices. Thus, in several embodiments, each user computing system(s) 112A, 112B may include one or more processors and associated memory configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory of the user computing system(s) 112A, 112B may generally be configured as memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor, including the set of output data and/or the set of defined data that can be retrieved, manipulated, created, and/or stored by the processor and instructions that can be executed by the processor, when implemented by the processor, configure the user computing system(s) 112A, 112B to perform various computer-implemented functions, such as one or more aspects of the methods described herein. In addition, the user computing system(s) 112A, 112B may also include various other suitable components, such as a communications circuit or module, one or more input/output channels, a data/control bus, and/or the like. In several examples, the user computing system(s) 112A, 112B may be a mobile device, tablet computer, laptop computer, desktop computer, watch, virtual reality device, television, monitor, or any other computing device or another visual device.

Additionally, communications from the applications 114, even though these communications may indicate one of the vehicle(s) 12A, 12B and/or the implement 14 as an intended recipient, can also be directed to the server 104. The application 114 is generally any appropriate services or applications that are accessible through any part of the network/cloud 108 and may be capable of interacting with the vehicle(s) 12A, 12B and/or the implement 14, the remote platform 102, and/or the user computing system(s) 112A, 112B. In some of the examples described, the first user computing system(s) 112A will be referenced as being operated by a fleet manager, whereas the second user computing system(s) 112B will be referenced as being operated by a potential operator of one of the fleet vehicles and/or implements.

In some examples, authorized fleet managers register the vehicle(s) 12A, 12B and/or the implement 14 of the agricultural fleet 10 and/or operators through the user computing system(s) 112A and/or through any other device. Registration of the vehicle(s) 12A, 12B and/or the implement 14 may allow for a set of machine data, a set of output data, and/or a set of defined data to be transmitted to/from the one or more vehicles 12 and/or the equipment 14 to the user computing system(s) 112A, 112B. Additionally, or alternatively, registration of the vehicle(s) 12A, 12B and/or the implement 14 may allow the server 104 to communicate directly or indirectly with the vehicle(s) 12A, 12B and/or the implement 14. Similarly, registration of operator(s) may allow for operators to access the registered vehicle(s) 12A, 12B and/or the implement 14. According to some examples, the computing systems 16A, 16B, 16C of the vehicles 12A, 12B and/or the implement 14 can be preconfigured at the time of manufacture with a communication address (e.g. a URL, an IP address, etc.) for communicating with the network/cloud 108 and may or may not have the ability to upgrade or change or add to the preconfigured communication address.

In several embodiments, an application interface 110 may be operably coupled with the network/cloud 108, the server 104, and/or the application 114. The application interface 110 may be configured to send/receive communications (e.g., data, instructions, etc.) between the computing systems 16A, 16B, 16C of the vehicles 12A, 12B and/or the implement 14, the user computing system(s) 112A, 112B, and the remote platform 102. The application interface 110 can be implemented in hardware, software, or a suitable combination of hardware and software, and which can be one or more software systems operating on a general-purpose processor platform, a digital signal processor platform, or other suitable processors.

It is often time consuming and difficult to manage individual operator access to each vehicle 12A, 12B and/or implement 14 of the agricultural fleet 10, particularly when there are large numbers of operators and/or fleet vehicles. Thus, as will be described below in greater detail with reference to FIG. 2, the fleet management system 100 can be used to manage such individual operator access to vehicles and implements of the agricultural fleet 10.

It should be appreciated that, while the agricultural fleet 10 is shown as having only two agricultural work vehicles 12A, 12B and one implement 14, the agricultural fleet 10 may have any suitable number of agricultural work vehicles and/or implements, such as three, ten, fifty, one hundred, etc. agricultural work vehicles and/or implements.

Figure 2:
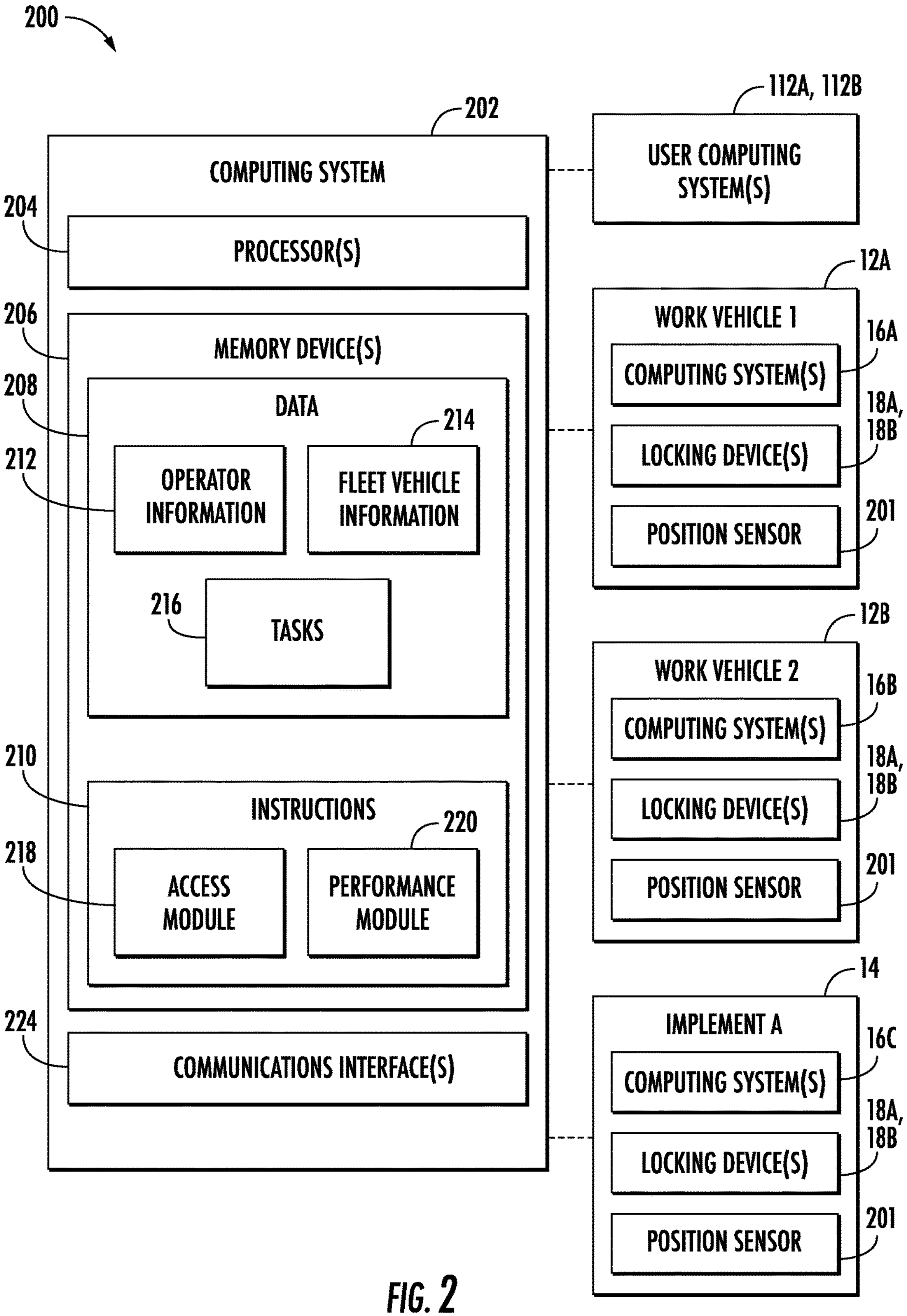
FIG. 2 illustrates a schematic view of a system for managing a fleet of agricultural work vehicles in accordance with aspects of the present subject matter.

Referring now to FIG. 2, a schematic view of one embodiment of a system 200 for managing a fleet of agricultural vehicles is illustrated in accordance with aspects of the present subject matter. In general, the system 200 will be described herein with reference to the agricultural fleet 10 and the fleet management system 100 described above with reference to FIG. 1. However, it should be appreciated by those of ordinary skill in the art that the disclosed system 200 may generally be utilized with agricultural fleets having any other suitable fleet vehicles and/or implements and/or with fleet management systems having any other suitable system configurations. Additionally, it should be appreciated that, for purposes of illustration, communicative links or electrical couplings of the system 200 shown in FIG. 2 are indicated by dashed lines.

In several embodiments, the system 200 may include a computing system 202 and various other components configured to be communicatively coupled to and/or controlled by the computing system 202, such as user computing system(s) (e.g., the user computing system(s) 112A, 112B), fleet work vehicle(s) (e.g., the computing systems 16A, 16B of the work vehicle(s) 12A, 12B), fleet implement(s) (e.g., the computing system 16C of the implement 14), and/or any other suitable components. The user computing system(s) 112A, 112B, the work vehicle(s) 12A, 12B, and the implement 14 may include without limitation, any combination of input and/or output devices that allow an operator to provide fleet manager or operator inputs to the computing system 202 and/or that allow the computing system 202 to provide feedback to the fleet manager or operator, such as a keyboard, keypad, pointing device, buttons, knobs, touch sensitive screen, mobile device, audio input device, audio output device, and/or the like. Moreover, as described above, the work vehicle(s) 12A, 12B and the implement 14 may include the computing systems 16A, 16B, 16C communicatively coupled to the one or more locking devices 18A, 18B (e.g., such as a keypad, a barcode reader configured to read a barcode (e.g., on an ID badge), a magnetic card reader configured to read a magnetic swipe card, a wireless device reader configured to receive signals from a wireless device (e.g., an electronic key fob, RFID tag, cellphone, etc.)) for locking and unlocking entrance areas (e.g., operator cabs) and/or operation controls (e.g., ignitions, control panels, etc.) of the agricultural vehicles 12A, 12B and/or the implement(s) 14. Additionally, the work vehicle(s) 12A, 12B and/or the implement 14 may include one or more positioning devices 201 configured to generate data indicative of the location of the work vehicle(s) 12A, 12B and/or the implement 14, such as a satellite navigation positioning device (e.g., a GPS system, a Galileo positioning system, a Global Navigation satellite system (GLONASS), a BeiDou Satellite Navigation and Positioning system, a dead reckoning device, and/or the like), where the positioning device(s) 201 may be communicatively coupled with the computing systems 16A, 16B, 16C and/or the computing system 202.

In general, the computing system 202 may correspond to any suitable processor-based device(s), such as a computing device or any combination of computing devices. Thus, as shown in FIG. 2, the computing system 202 may generally include one or more processor(s) 204 and associated memory devices 206 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor (s) 204, including data 208 that can be retrieved, manipulated, created and/or stored by the processor(s) 204 and instructions 210 that can be executed by the processor(s) 204.

It should be appreciated that the computing system 202 may correspond to the remote platform computing system 102, the remote server 104, or may correspond to a separate processing device or combination of processing devices. For instance, in one embodiment, the computing system 202 may form all or part of a separate plug-in module that may be installed in operative association with the remote platform computing system 102, the remote server 104, and/or the like to allow for the disclosed system and method to be implemented without requiring additional software to be uploaded onto existing control devices of the remote platform computing system 102, the remote server 104, and/or the like.

In several embodiments, the data 208 may be stored in one or more databases. For example, the data 208 may include an operator information database 212 for storing information associated with one or more potential operators of the agricultural fleet 10 received from the user computing system(s) 112A, 112B or another source. For instance, the operator information database 212 may store a log correlating an operator's identification (e.g., name, identification number, etc.) with an operator's credentials (e.g., driver's license(s), training certificates, job title, experience, etc.) and optional associated limits (e.g., expiration date, dues, continuing education requirements, etc.), performance ratings (e.g., efficiency ratings, infractions, etc.), and/or the like. Similarly, the data 208 may include a fleet vehicle information database 214 for storing information associated with each work vehicle and/or implement of the agricultural fleet 10. For instance, the fleet vehicle information database 214 may store a log correlating vehicle identification (e.g., vehicle/implement identification number, vehicle type, etc.) with credential requirements to drive and/or operate (e.g., necessary driver's license(s), training certificates, job title, experience, etc.), operating data (e.g., operating time, average vehicle speed, vehicle/implement settings, vehicle/implement sensor data, etc.), maintenance records, and/or the like. Additionally, as will be described in greater detail below with reference to FIGS. 3A-3E, the data 208 may further include a task database 216 for storing information associated with one or more work tasks. For instance, the task database 216 may store a log correlating each work task with operators and/or vehicles/implements of the agricultural fleet 10 assigned to perform the task. As indicated above, the work tasks may be any suitable agricultural work tasks such as, but not limited to, tilling, seeding, planting, fertilizing, spraying, harvesting, baling, maintenance (e.g., of the work vehicle/implement), transporting (e.g., of the work vehicle/implement between fields, etc.), and/or the like. In some instances, the task database 216 may be configured to log operation/access of vehicles/implements of the agricultural fleet 10 by assigned operators.

Figure 3A:
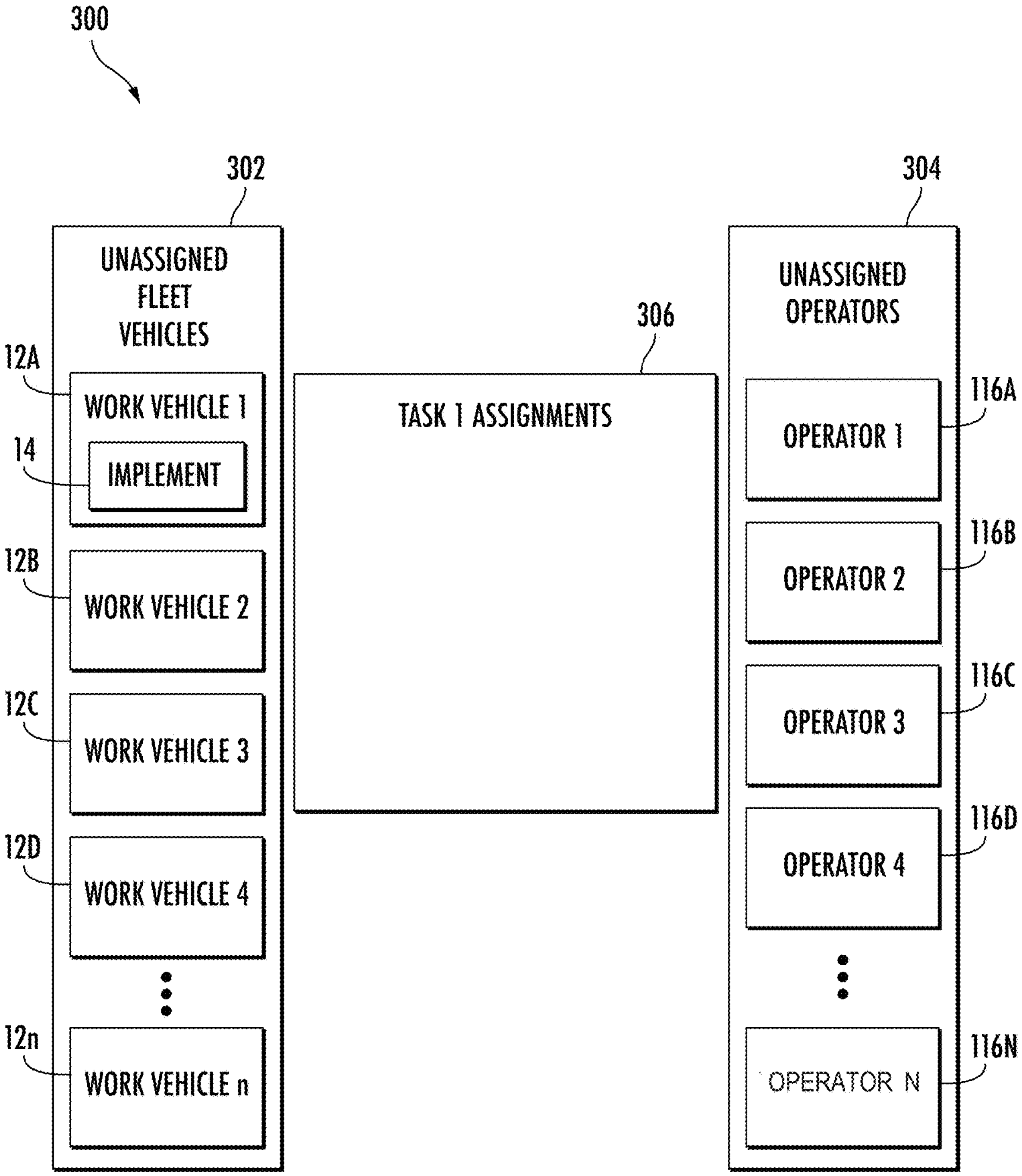
FIGS. 3A-3E illustrate various examples of managing a fleet of agricultural work vehicles with the system described in FIGS. 1 and 2.

Referring still to FIG. 2, in several embodiments, the instructions 210 stored within the memory 206 of the computing system 202 may be executed by the processor(s) 204 to implement an access module 218. In general, the access module 218 may be used to manage task assignments for the vehicle fleet 10. For instance, referring to FIGS. 3A-3E, different examples of managing a fleet of agricultural work vehicles (e.g., fleet 10) with the system 202 are illustrated in accordance with aspects of the present subject matter. As part of a management process 300, as shown in FIG. 3A, the access module 218 (FIG. 2) may receive a list of one or more unassigned fleet vehicles 302 of the fleet 10 (e.g., from the managing user(s) via the user computing system(s) 112A or from fleet vehicle information database 214). For example, the list of unassigned fleet vehicles 302 may include the first work vehicle 12A (and associated implement 14), the second work vehicle 12B, a third work vehicle 12C, a fourth work vehicle 12D, and/or any other work vehicle up through work vehicle 12*n*. Similarly, the access module 218 (FIG. 2) may receive or read a list of one or more unassigned operators 304 (e.g., from the managing user(s) via the user computing system(s) 112A or from the operator information database 212). The list of unassigned operators 304 may include, for example, a first operator 116A, a second operator 116B, a third operator 116C, a fourth operator 116D, and/or any other suitable operator up through operator 116N. Additionally, the access module 218 (FIG. 2) may receive a first task 306 to which one or more of the unassigned fleet vehicles 302 and/or one or more of the unassigned operators 304 may be assigned (e.g., from the managing user(s) via the user computing system(s) 112A or from the task database 216). The task 306 may be any suitable agricultural task, such as, but not limited to, tilling, seeding, planting, fertilizing, spraying, harvesting, baling, maintenance, transporting, and/or the like.

Figure 3B:
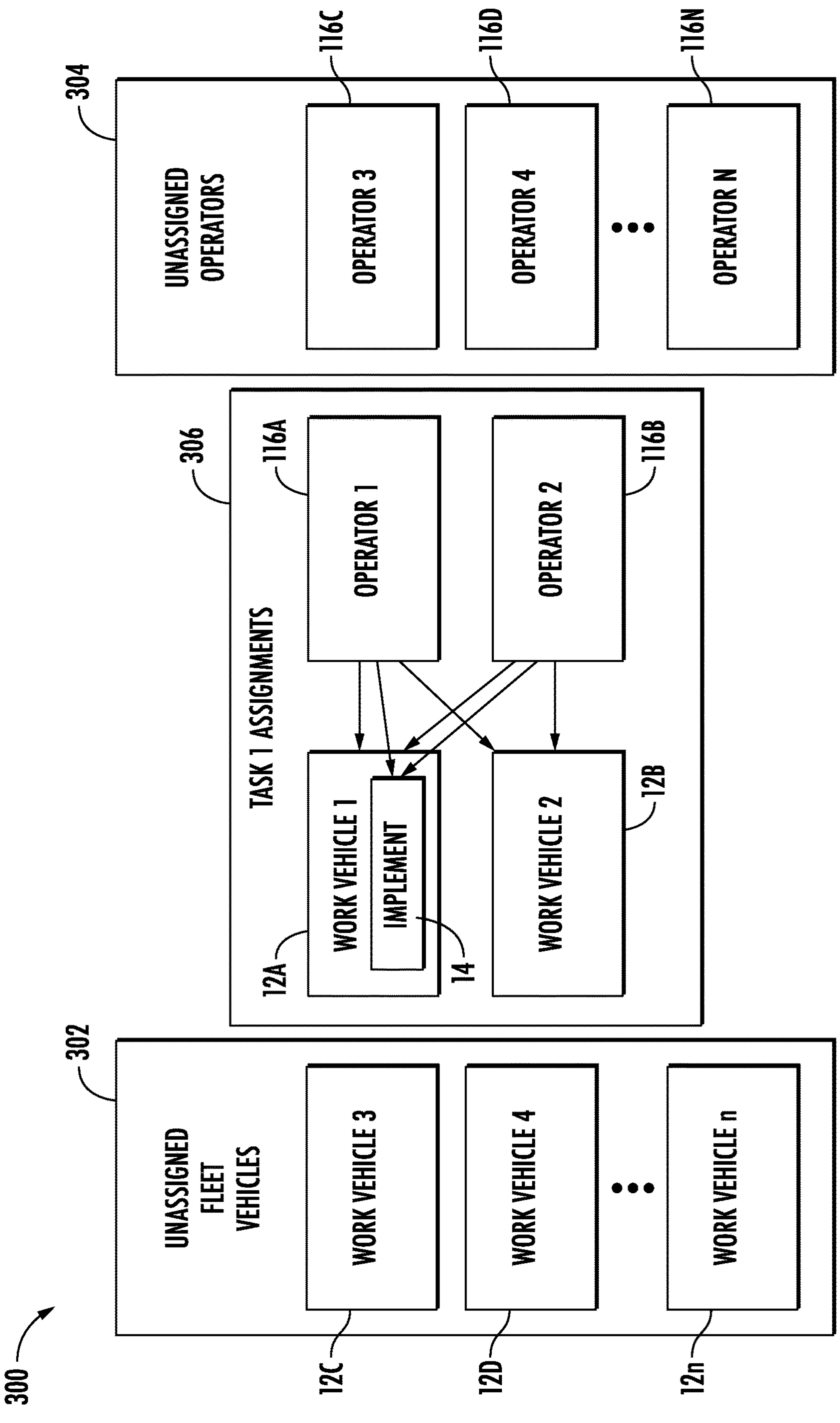

Thereafter, the access module 218 (FIG. 2) may receive an input assigning one or more of the fleet vehicles/implements and an input assigning one or more of operators to the first task 306. For example, as shown in FIG. 3B, the input assigning one or more of the fleet vehicles/implements assigns, or requests to assign, the first work vehicle 12A (and thus, associated implement 14) and the second work vehicle 12B to the first task 306. It should be appreciated that the input assigning one or more of the fleet vehicles/implements to the first task 306 may be a selection from the list of unassigned fleet vehicles 302 or may be newly input. Similarly, the input assigning one or more of operators to the first task 306 assigns, or requests to assign, the first operator 116A and the second operator 116B to the first task 306. It should similarly be appreciated that the input assigning one or more of operators to the first task 306 may be a selection from the list of unassigned operators 304 or may be newly input.

In some embodiments, once inputs assigning at least one work vehicle and at least one operator to a task have been received, the operators (e.g., operators 116A, 116B) assigned to the task (e.g., task 306) may automatically be given access to the work vehicle(s) (and associated implements) assigned to the task (e.g., work vehicles 12A, 12B and implement 14). For instance, in some embodiments, the respective user computing system associated with each of the assigned operators 116A, 116B may be provided a digital key for accessing each of the assigned work vehicle(s). The user computing system(s) may use the digital key as a token, for example, to interact with the work vehicle(s) (e.g., with the computing system(s) 16A, 16B, 16C) to wirelessly enter and/or operate each of the assigned work vehicles. In some instances, the digital key may be used to automatically unlock/access the work vehicle(s) when the user computing system is within range of the work vehicle(s) (e.g., using NFC technology, and/or the like). In one or more embodiments, another identifier associated with each of the assigned operators 116A, 116B (e.g., operator identification number, username/password login information, badge barcode identifier, magnetic card identifier, electronic key fob identifier, RFID tag identifier, etc.) may additionally, or alternatively, be identified as an authorized identifier for allowing access to each of the assigned work vehicles (e.g., via entry of the authorized operator identification number or the authorized username/password into a keypad, scanning of the authorized badge barcode, swipe of the authorized magnetic card, sensing a signal of the authorized electronic key fob, sensing of the authorized RFID tag, an authorized cellphone, etc.).

As indicated above, in some instances, "access" to an agricultural fleet vehicle may include different access levels, including an entry only access level (e.g., allowing entry, but not operation of features for driving or performing agricultural operations), a partial operation access level (e.g., allowing entry and operation of features for driving, but not operation of features for performing agricultural operations), or a full operation access level (e.g., allowing entry, operation of features for driving, and operation of features for performing agricultural operations), and/or the like. As such, in some embodiments, before the operators assigned to the task may automatically be given access to the work vehicle (s) (and associated implements) assigned to the task, the computing system 202 may be configured to compare credentials of each of the operators assigned to the task to credential requirements for each vehicle assigned to the task and only provide the access level with matching credentials.

Figure 3C:
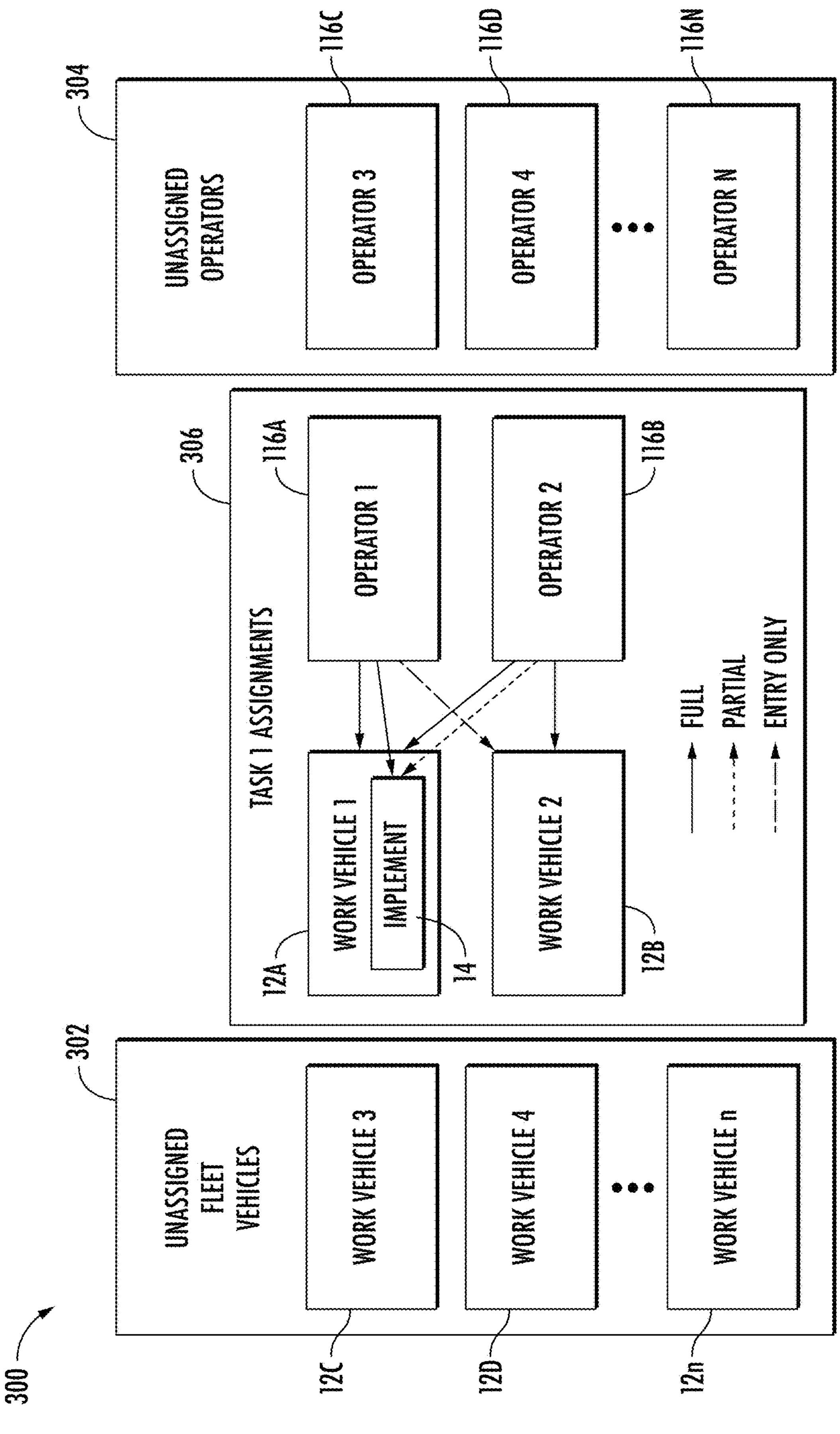

For instance, in the example of FIG. 3C, the first operator 116A assigned to the task 306 may have the appropriate or matching credentials to enter and operate both the first work vehicle 12A and the implement 14. As such, the first operator 116A may be authorized at the full operation access level associated with entry and full operation of the first work vehicle 12A and the implement 14 (e.g., as indicated with solid-lined arrows between the first operator 116A and both the vehicle 12A and the implement 14 in FIG. 3C) based on the comparison. However, the first operator 116A may only have the appropriate or matching credentials to enter the second work vehicle 12B, but not drive or perform agricultural operations with the second work vehicle 12B. As such, the first operator 116A may be authorized at the entry only access level for the second work vehicle 12B (e.g., as indicated with the large-dashed lined arrow between the first operator 116A and the second work vehicle 12B). As another example, the second operator 116B may have the appropriate or matching credentials to enter and operate the first work vehicle 12A, but only to enter and tow the implement 14. As such, the second operator 116B may be authorized at the full access level for the first work vehicle 12A (e.g., as indicated with the solid-lined arrow between the second operator 116B and the first work vehicle 12A) but only authorized at the partial operation access level for the implement 14 (e.g., as indicated with the small-dashed lined arrow between the second operator 116B and the implement 14). Moreover, the second operator 116B may have the appropriate or matching credentials to enter and operate the second work vehicle 12B. Accordingly, the second operator 116B may be authorized at the full access level for the second work vehicle 12B (e.g., as indicated with the solid-lined arrow between the second operator 116B and the second work vehicle 12B). Thus, an operator may automatically be assigned the appropriate access level for each vehicle and implement of a task, which reduces management time and conserves computer resources. This is particularly advantageous if an operator's credentials change (e.g., if the operator gets new credentials, if credentials expire, if credentials are suspended/revoked, etc.), as the operator's access levels may be automatically updated upon credential changes.

In some instances, when an operator does not have the appropriate credentials to drive and/or operate a work vehicle and/or implement assigned to a task, the operator may be given a higher access level (e.g., partial and/or full access level) by the computing system 202 if another operator with the higher access level is also present to supervise. For instance, in the example of FIG. 3C, the first operator 116A may be authorized at the full access level for the second work vehicle 12B if the second operator 116B is present with the first operator 116A at the second work vehicle 12B. Similarly, the second operator 116B may be authorized at the full access for the implement 14 if the first operator 116A is present with the second operator 116B at the implement 14. The computing system 202 may determine that an appropriately authorized operator is present with the under-authorized operator based, for instance, on the location data from a user computing system associated with the appropriately authorized operator and location data from a user computing system associated with the under-authorized operator indicating that the appropriately authorized operator is within a threshold distance of the under-authorized operator. Additionally, or alternatively, the computing system 202 may determine that an appropriately authorized operator is present with the under-authorized operator based on receiving the identifier (e.g., digital key, operator identification number, username/password login information, badge barcode identifier, magnetic card identifier, electronic key fob identifier, RFID tag identifier, cellphone identifier, etc.) of both the authorized operator and the under-authorized operator at the fleet work vehicle and/or implement for which the under-authorized operator is under-authorized. As such, access levels may be automatically adjusted for supervised training without requiring further input by a fleet manager, which reduces management time and conserves computer resources.

Figure 3D:
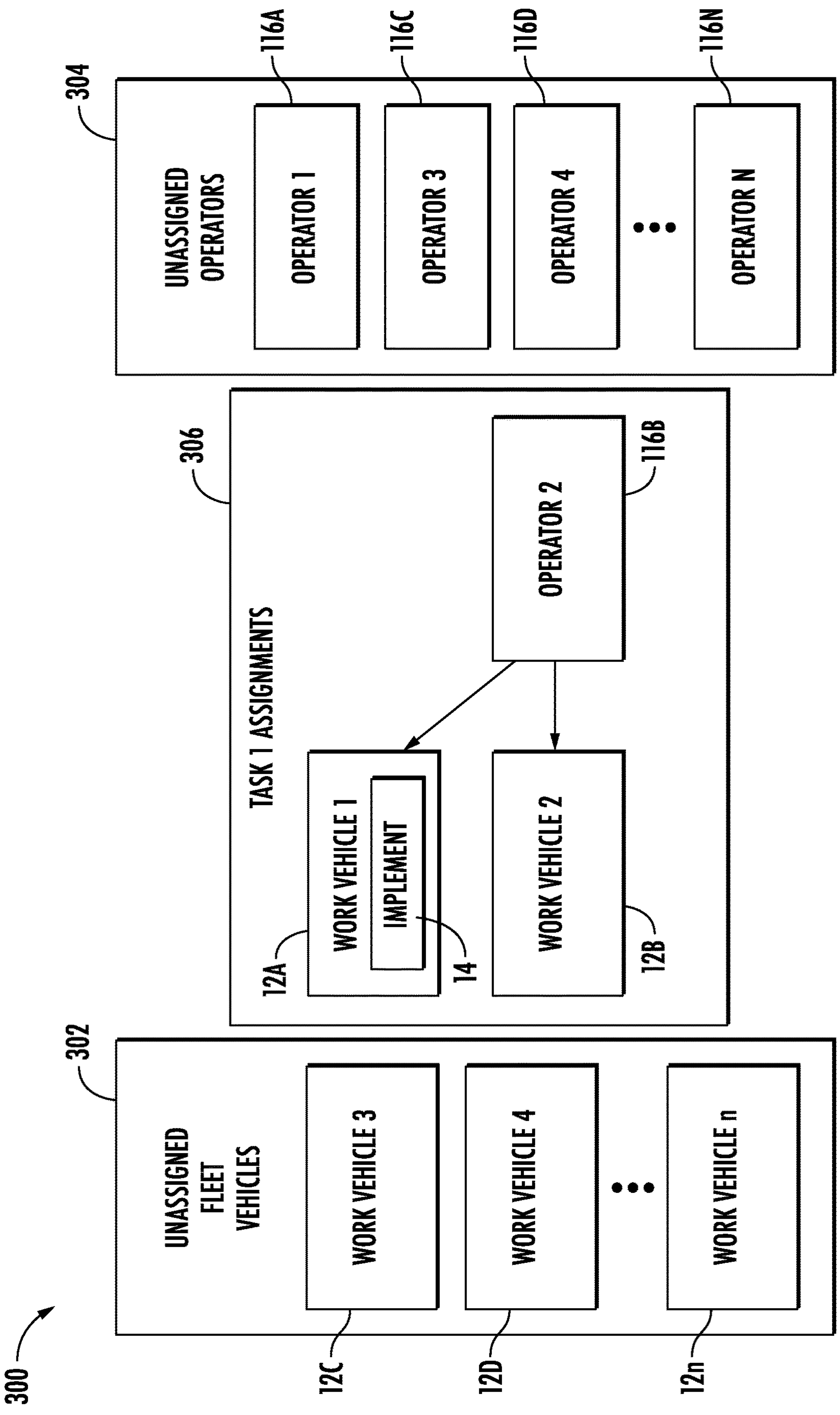

In one or more embodiments, when an input indicative of removing an operator from a task is received, the computing system 202 may be configured to automatically revoke access to vehicles and/or implements of the task from the operator. For instance, as shown in FIG. 3D, the first operator 116A has been removed from the task 306, and thus, no longer has access to the first work vehicle 12A, the implement 14, or the second work vehicle 12B (e.g., as indicated by the lack of arrows between the first operator 116A and each of the first work vehicle 12A, the implement 14, or the second work vehicle 12B). In order to revoke access, the computing system 202 may indicate that the digital key and/or other identifier (e.g., operator identification number, username/password login information, badge barcode identifier, magnetic card identifier, electronic key fob identifier, RFID tag identifier, cellphone identifier, etc.) associated with the operator (e.g., the first operator 116A) being removed from the task 306 is no longer authorized. For example, the computing system 202 may remove the relationship between the identifier(s) associated with the first operator 116A and the task 306 from the task database 216 and/or may remove the authorized access level(s) associated with the first operator 116A for the task 306 in the task database 216. In some instances, an input may be received indicative of completely removing the first operator 116A from the operator information database 212 (e.g., upon employment termination, probation, leave of absence, etc.), which would similarly cause the computing system 202 to revoke access of the first operator 116A from the task 306 and removal of the first operator 116A from the unassigned operators list 304. Accordingly, a fleet manager does not need to individually remove an operator's access for each vehicle and/or implement to which the operator has access, which reduces management time and conserves computer resources.

Figure 3E:
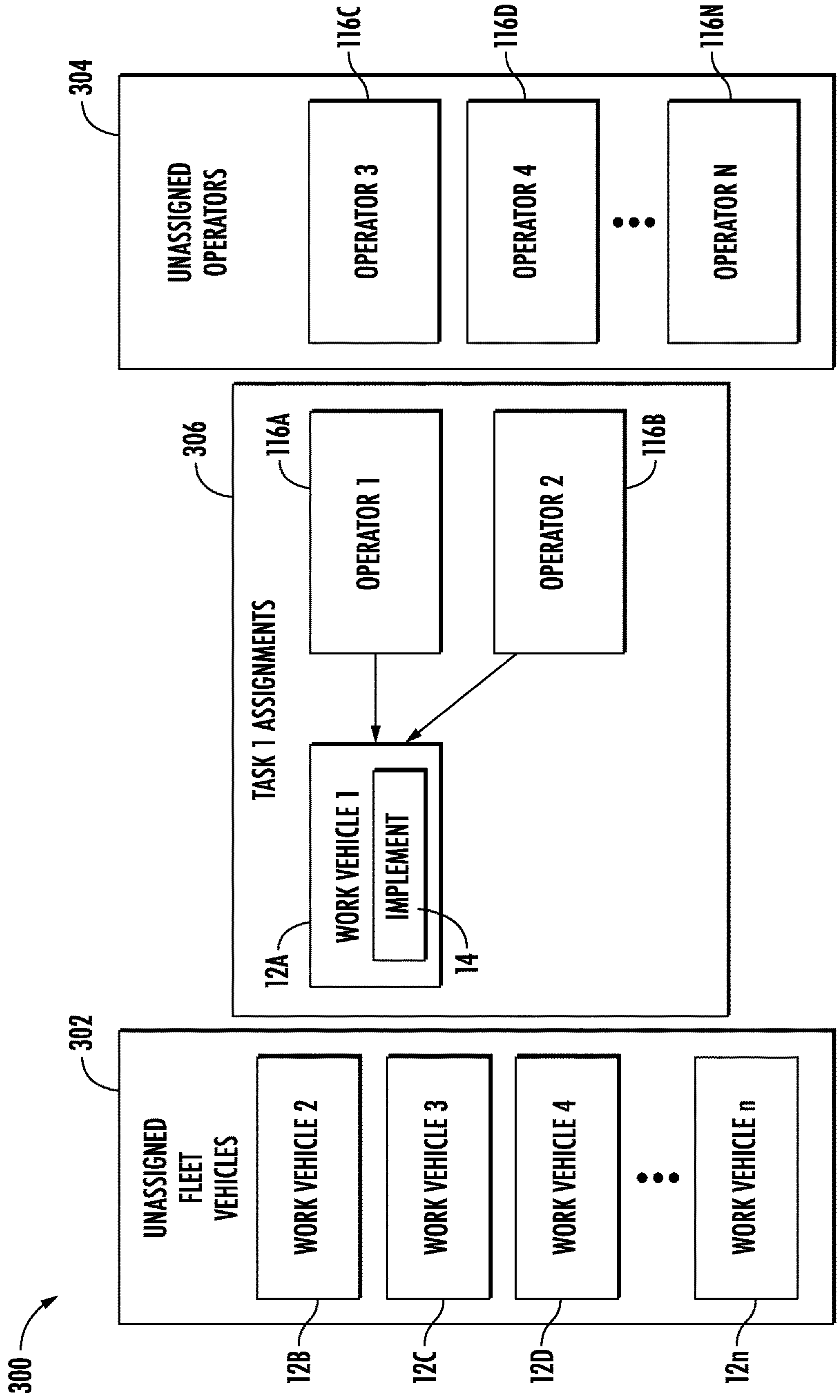

Similarly, in one or more embodiments, when an input indicative of removing a vehicle and/or an implement from a task is received, the computing system 202 may be configured to automatically revoke access to the vehicle and/or implement removed from the task. For instance, as shown in FIG. 3E, the second work vehicle 12B has been removed from the task 306. As such, the first operator 116A and the second operator 116B no longer have access to the second work vehicle 12B (e.g., as indicated by the lack of arrows between the second work vehicle 12B and each of the first operator 116A and the second operator 116B). Access to the second work vehicle 12B may be revoked from the first and second operators 116B similar to as described above with reference to FIG. 3D. Additionally, in some instances, the computing system 202 may remove the relationship between the identifier associated with the second work vehicle 12B and the task 306 from the task database 216. In some instances, an input may be received indicative of completely removing the second work vehicle 16B from the fleet vehicle information database 214 (e.g., upon sale, etc.), which would similarly cause the computing system 202 to remove the second work vehicle 16B from the task 306 and remove the second work vehicle 16B from the unassigned fleet vehicles list 302. Accordingly, a fleet manager does not need to remove each individual operator's access for each vehicle and/or implement removed from a task, which reduces management time and conserves computer resources.

In one embodiment, the computing system 202 may provide a notification to operators when their task status and/or access level changes. For instance, the computing system 202 may transmit a notification to the operators (e.g., to computing system(s) 112B) indicating when the operators are assigned a new task, removed from a task, provided access to a new vehicle/implement, and/or have access to a vehicle/implement removed. It should be appreciated that one operator may be assigned to multiple tasks at a given time. Similarly, it should be appreciated that one vehicle/implement may be assigned to multiple tasks at a given time.

Referring back to FIG. 2, in some embodiments, the instructions 210 stored within the memory 206 of the computing system 202 may be executed by the processor(s) 204 to implement a performance module 220. In general, the performance module 220 may be configured to monitor operations of the work vehicles/implements assigned to a task during the operation of work vehicles/implements of the fleet 10 for the assigned task. For instance, the performance module 220 may be configured to access operating data (e.g., operating time, average vehicle speed, vehicle/implement settings, vehicle/implement sensor data, etc.), maintenance records, and/or the like from the vehicle fleet information database 214 and determine vehicle/implement efficiency, necessary maintenance, and/or the like based on such operating data and maintenance records. Additionally, in some instances, the performance module 220 may correlate data from the vehicle fleet information database 214 to a log stored by the task database 216 indicating when vehicles/implements of the agricultural fleet 10 of a task are accessed/operated by assigned operators to determine the efficiency of individual operators of the task. The determined efficiency of individual operators may then be stored in the operator information database 212.

For example, the performance module 220 may compare the determined vehicle/implement efficiency to a desired or average vehicle/implement efficiency. If the determined vehicle/implement efficiency of a particular vehicle/implement of the field varies from the desired or average vehicle/implement efficiency by a given amount, the performance module 220 may compare the efficiency of the associated operator(s) for the associated operation period to an expected or average efficiency. If the efficiency of the associated operator(s) is within a given threshold of the expected or average efficiency, the performance module 220 may determine that the vehicle/implement needs to be inspected. Otherwise, if the efficiency of the associated operator(s) is outside of a given threshold of the expected or average efficiency, the performance module 220 may determine that the associated operator(s) need further training, more supervision, and/or the like. Similarly, the performance module 220 may determine from the operating time of each vehicle/implement and the maintenance records from the vehicle fleet information database 214 when each vehicle/implement requires regular maintenance. In some instances, the performance module 220 may notify a fleet manager (e.g., via the user computing system(s) 112A, 112B) that the particular vehicle/implement may need servicing, that an operator needs further training/supervision, and/or the like. The efficiency of a vehicle/implement and/or of the individual operators assigned to a task may be used to more accurately estimate costs for future tasks.

Additionally, as shown in FIG. 2, the computing system 202 may also include a communications interface 224 to provide a means for the computing system 202 to communicate with any of the various other system components described herein.

Figure 4:
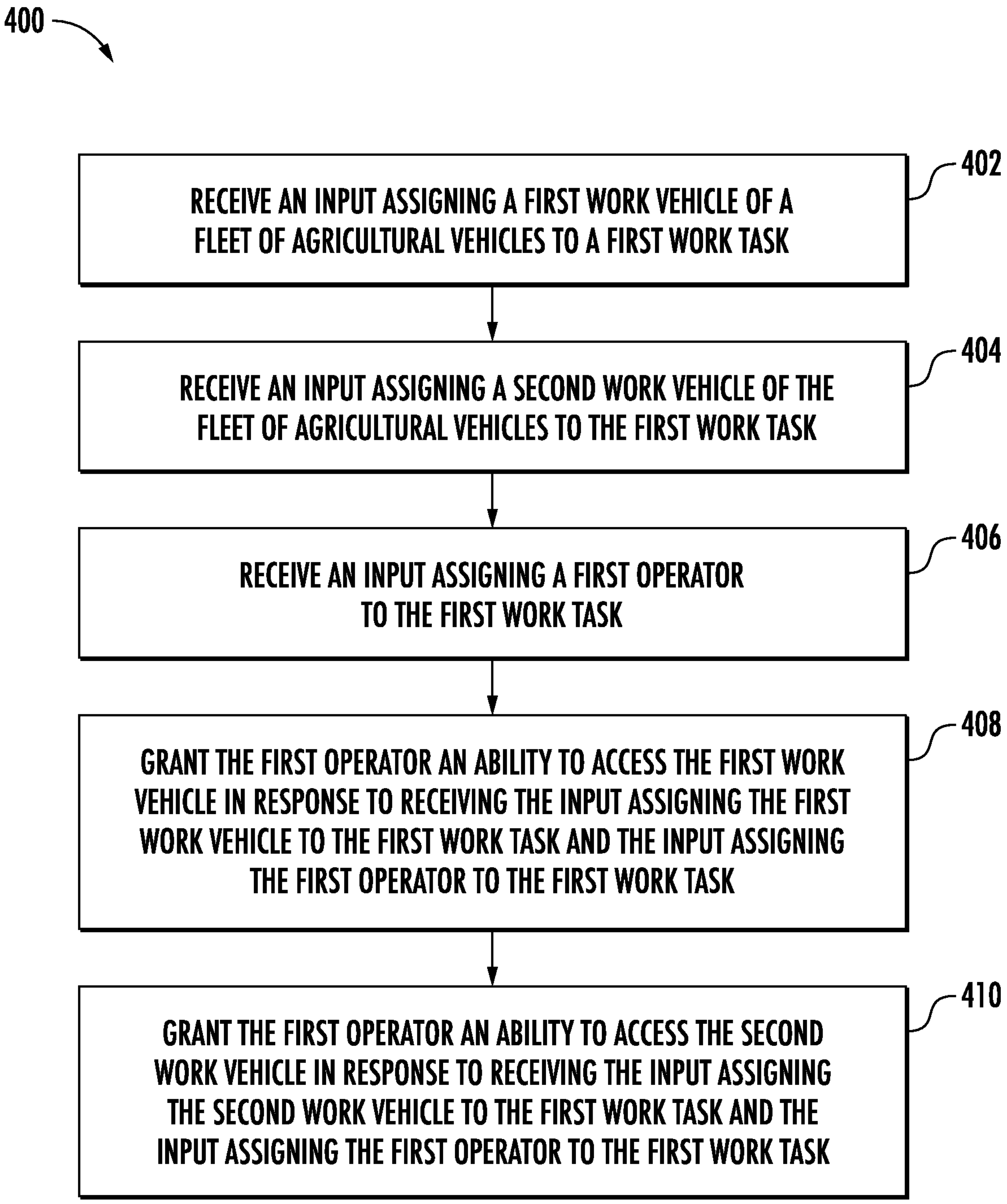
FIG. 4 illustrates a flow diagram of one embodiment of a method for managing a fleet of agricultural work vehicles in accordance with aspects of the present subject matter.

Referring now to FIG. 4, a flow diagram of one embodiment of a method 400 for managing a fleet of agricultural work vehicles is illustrated in accordance with aspects of the present subject matter. In general, the method 400 will be described herein with reference to the agricultural fleet 10 and fleet management system 100 shown in FIG. 1, as well as the system 200 shown in FIG. 2 described with reference to the various examples shown in FIGS. 3A-3E. However, it should be appreciated that the disclosed method 400 may be implemented with agricultural fleets having any other suitable configurations, with fleet management systems having any other suitable configurations, and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (402), the method 400 may include receiving an input assigning a first work vehicle of a fleet of agricultural vehicles to a first work task. For instance, as described above, the computing system 202 may receive an input (e.g., from a fleet manager via the user computing device 112A) assigning a first work vehicle (e.g., the first work vehicle 12A) to a first work task (e.g., tilling, seeding, planting, fertilizing, spraying, harvesting, baling, maintenance, transporting, and/or the like) to be performed using the first work vehicle.

Similarly, at (404), the method 400 may include receiving an input assigning a second work vehicle of the fleet of agricultural vehicles to the first work task. For instance, as discussed above, the computing system 202 may receive an input (e.g., from a fleet manager via the user computing device 112A) assigning a second work vehicle (e.g., the second work vehicle 12B) to the first work task for the second work vehicle to be additionally, or alternatively, used for performing the first work task.

Further, at (406), the method 400 may include receiving an input assigning a first operator to the first work task. For example, as discussed above, the computing system 202 may also receive an input assigning a first operator to the first work task.

Moreover, at (408), the method 400 may include granting the first operator an ability to access the first work vehicle in response to receiving the input assigning the first work vehicle to the first work task and the input assigning the first operator to the first work task. For instance, as described above, the computing system 202 may grant the first operator an ability to access the first work vehicle 12A in response to receiving the input assigning the first work vehicle 12A to the first work task and the input assigning the first operator to the first work task. As indicated above, the computing system 202 may, in some embodiments, compare credentials of the first operator to credential requirements of the first work vehicle 12A before granting the ability to access the first work vehicle 12A to the first operator.

Additionally, at (410), the method 400 may similarly include granting the first operator an ability to access the second work vehicle in response to receiving the input assigning the second work vehicle to the first work task and the input assigning the first operator to the first work task. For instance, as discussed above, the computing system 202 may grant the first operator an ability to access the second work vehicle 12B in response to receiving the input assigning the second work vehicle 12B to the first work task and the input assigning the first operator to the first work task. As indicated above, the computing system 202 may, in some embodiments, compare the credentials of the first operator to credential requirements of the second work vehicle 12B before granting the ability to access the first work vehicle 12B to the first operator.

It is to be understood that the steps of the method 400 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 400, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 400 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for managing a fleet of agricultural vehicles, the system comprising:

a first work vehicle of the fleet of agricultural work vehicles;

a second work vehicle of the fleet of agricultural work vehicles;

a computing system communicatively coupled with the first and second work vehicles, the computing system being configured to:

receive, via one or more user input devices, an input from a fleet manager assigning the first work vehicle to a first work task associated with performing an agricultural operation;

receive, via the one or more user input devices, an input assigning the second work vehicle to the first work task;

receive, via the one or more user input devices, another input from the fleet manager assigning a first operator to the first work task;

grant the first operator an ability to access the first work vehicle in response to receiving the input assigning the first work vehicle to the first work task and the other input assigning the first operator to the first work task; and grant the first operator an ability to access the second work vehicle in response to receiving the input assigning the second work vehicle to the first work task and the other input assigning the first operator to the first work task.

2. The system of claim 1, wherein the computing system is further configured to compare credentials of the first operator to credential requirements of each vehicle assigned to the first work task, wherein the computing system is configured to grant the first operator the ability to access the first work vehicle in response to receiving the input assigning the first work vehicle to the first work task, receiving the other input assigning the first operator to the first work task, and the credentials of the first operator matching the credential requirements of the first work vehicle based on the comparison of the credentials of the first operator to the credential requirements of each vehicle assigned to the first work task, and wherein the computing system is configured to grant the first operator the ability to access the second work vehicle in response to receiving the input assigning the second work vehicle to the first work task, receiving the other input assigning the first operator to the first work task, and the credentials of the first operator matching the credential requirements of the second work vehicle based on the comparison of the credentials of the first operator to the credential requirements of each vehicle assigned to the first work task.

3. The system of claim 2, wherein the credential requirements comprise credential requirements for operating first features of the first work vehicle, credential requirements for operating second features of the first work vehicle, credential requirements for operating first features of the second work vehicle, and credential requirements for operating second features of the second work vehicle, wherein the computing system is configured to grant the first operator the ability to operate the first features of the first work vehicle when the credentials of the first operator match the credential requirements for operating the first features of the first work vehicle, wherein the computing system is configured to grant the first operator the ability to operate the second features of the first work vehicle when the credentials of the first operator match the credential requirements for operating the second features of the first work vehicle, wherein the computing system is configured to grant the first operator the ability to operate the first features of the second work vehicle when the credentials of the first operator match the credential requirements for operating the first features of the second work vehicle, and wherein the computing system is configured to grant the first operator the ability to operate the second features of the second work vehicle when the credentials of the first operator match the credential requirements for operating the second features of the second work vehicle.

4. The system of claim 2, wherein the computing system is further configured to:

receive, via the one or more user input devices, an input assigning a second operator to the first work task;

compare credentials of the second operator to the credential requirements of each vehicle assigned to the first work task;

grant the second operator an ability to access the first work vehicle in response to receiving the input assigning the first work vehicle to the first work task, receiving the input assigning the second operator to the first work task, and the credentials of the second operator matching the credential requirements of the first work vehicle based on the comparison of the credentials of the second operator to the credential requirements of each vehicle assigned to the first work task; and grant the second operator an ability to access the second work vehicle in response to receiving the input assigning the second work vehicle to the first work task, receiving the input assigning the second operator to the first work task, and the credentials of the second operator matching the credential requirements of the second work vehicle based on the comparison of the credentials of the second operator to the credential requirements of each vehicle assigned to the first work task, wherein the computing system is configured to grant the first operator the ability to access the first work vehicle in response to receiving the input assigning the first work vehicle to the first work task, receiving the other input assigning the first operator to the first work task, the credentials of the first operator not matching the credential requirements of the first work vehicle, the second operator being granted the ability to access the first work vehicle, and the second operator being present with the first operator in the first work vehicle, and wherein the computing system is configured to grant the first operator the ability to access the second work vehicle in response to receiving the input assigning the second work vehicle to the first work task, receiving the other input assigning the first operator to the first work task, and the credentials of the first operator not matching the credential requirements of the second work vehicle, the second operator being granted the ability to access the second work vehicle, and the second operator being present with the first operator in the second work vehicle.

5. The system of claim 1, wherein the computing system is further configured to:

receive, via the one or more user input devices, an input from the fleet manager removing the first operator from the first work task; and revoke from the first operator the ability to access the first work vehicle and the ability to access the second work vehicle in response to receiving the input removing the first operator from the first work task.

6. The system of claim 1, wherein the computing system is further configured to log operation of the first and second work vehicles by the first operator.

7. The system of claim 1, further comprising a first user computing device associated with the first operator, wherein the computing system is configured to grant the first operator the ability to access the first work vehicle by granting the first user computing device associated with the first operator the ability to access the first work vehicle, and wherein the computing system is configured to grant the first operator the ability to access the second work vehicle by granting the first user computing device associated with the first operator the ability to access the second work vehicle.

8. The system of claim 7, wherein the computing system is configured to communicate with the first user computing device via an application operating on the first user computing device.

9. The system of claim 7, wherein the first user computing device is configured to communicate with the first work vehicle and the second work vehicle to allow the first operator to access the first work vehicle and the second work vehicle.

10. The system of claim 1, wherein the computing system is further configured to:

indicate to the first operator that the first operator has access to the first work vehicle in response to granting the first operator the ability to access the first work vehicle; and indicate to the first operator to that the first operator has access to the second work vehicle in response to granting the first operator the ability to access the second work vehicle.

11. The system of claim 1, wherein the first work task comprises at least one of tilling, seeding, planting, fertilizing, spraying, harvesting, baling, maintenance, or transporting.

12. A method for managing a fleet of agricultural vehicles, the method comprising:

receiving, by one or more user input devices of a computing system, an input from a fleet manager assigning a first work vehicle of a fleet of agricultural vehicles to a first work task associated with performing an agricultural operation;

receiving, by the one or more user input devices of the computing system, an input assigning a second work vehicle of the fleet of agricultural vehicles to the first work task;

receiving, by the one or more user input devices of the computing system, another input from the fleet manager assigning a first operator to the first work task;

granting, by the computing system, the first operator an ability to access the first work vehicle in response to receiving the input assigning the first work vehicle to the first work task and the other input assigning the first operator to the first work task; and granting, by the computing system, the first operator an ability to access the second work vehicle in response to receiving the input assigning the second work vehicle to the first work task and the other input assigning the first operator to the first work task.

13. The method of claim 12, further comprising comparing, by the computing system, credentials of the first operator to credential requirements of each vehicle assigned to the first work task, wherein granting the first operator the ability to access the first work vehicle comprises granting the first operator the ability to access the first work vehicle in response to receiving the input assigning the first work vehicle to the first work task, receiving the other input assigning the first operator to the first work task, and the credentials of the first operator matching the credential requirements of the first work vehicle based on the comparison of the credentials of the first operator to the credential requirements of each vehicle assigned to the first work task, wherein granting the first operator the ability to access the second work vehicle comprises granting the first operator the ability to access the second work vehicle in response to receiving the input assigning the second work vehicle to the first work task, the other input assigning the first operator to the first work task, and the credentials of the first operator matching the credential requirements of the second work vehicle based on the comparison of the credentials of the first operator to the credential requirements of each vehicle assigned to the first work task.

14. The method of claim 13, wherein the credential requirements comprise credential requirements for operating first features of the first work vehicle, credential requirements for operating second features of the first work vehicle, credential requirements for operating first features of the second work vehicle, and credential requirements for operating second features of the second work vehicle, wherein granting the first operator the ability to access the first work vehicle comprises granting the first operator the ability to operate the first features of the first work vehicle when the credentials of the first operator match the credential requirements for operating the first features of the first work vehicle and granting the first operator the ability to operate the second features of the first work vehicle when the credentials of the first operator match the credential requirements for operating the second features of the first work vehicle, and wherein granting the first operator the ability to access the second work vehicle comprises granting the first operator the ability to operate the first features of the second work vehicle when the credentials of the first operator match the credential requirements for operating the first features of the second work vehicle and granting the first operator the ability to operate the second features of the second work vehicle when the credentials of the first operator match the credential requirements for operating the second features of the second work vehicle.

15. The method of claim 13, further comprising:

receiving, by the one or more user input devices of the computing system, an input assigning a second operator to the first work task;

comparing, by the computing system, credentials of the second operator to the credential requirements of each vehicle assigned to the first work task;

granting, by the computing system, the second operator an ability to access the first work vehicle in response to receiving the input assigning the first work vehicle to the first work task, receiving the input assigning the second operator to the first work task, and the credentials of the second operator matching the credential requirements of the first work vehicle based on the comparison of the credentials of the second operator to the credential requirements of each vehicle assigned to the first work task; and granting, by the computing system, the second operator an ability to access the second work vehicle in response to receiving the input assigning the second work vehicle to the first work task, receiving the input assigning the second operator to the first work task, and the credentials of the second operator matching the credential requirements of the second work vehicle based on the comparison of the credentials of the second operator to the credential requirements of each vehicle assigned to the first work task, wherein granting the first operator the ability to access the first work vehicle comprises granting the first operator the ability to access the first work vehicle in response to receiving the input assigning the first work vehicle to the first work task, receiving the other input assigning the first operator to the first work task, the credentials of the first operator not matching the credential requirements of the first work vehicle, the second operator being granted the ability to access the first work vehicle, and the second operator being present with the first operator in the first work vehicle, and wherein granting the first operator the ability to access the second work vehicle comprises granting the first operator the ability to access the second work vehicle in response to receiving the input assigning the second work vehicle to the first work task, receiving the other input assigning the first operator to the first work task, the credentials of the first operator not matching the credential requirements of the second work vehicle, the second operator being granted the ability to access the second work vehicle, and the second operator being present with the first operator in the second work vehicle.

16. The method of claim 12, further comprising:

receiving, by the one or more user input devices of the computing system, an input from the fleet manager removing the first operator from the first work task; and revoking, by the computing system, from the first operator the ability to access the first work vehicle and the ability to access the second work vehicle in response to receiving the input removing the first operator from the first work task.

17. The method of claim 12, further comprising logging, by the computing system, operation of the first and second work vehicles by the first operator.

18. The method of claim 12, wherein granting the first operator the ability to access the first work vehicle comprises granting a first user computing device associated with the first operator the ability to access the first work vehicle, and wherein granting the first operator the ability to access the second work vehicle comprises granting the first user computing device associated with the first operator the ability to access the second work vehicle.

19. The method of claim 18, wherein granting the first user computing device the ability to access the first work vehicle or granting the ability to access the second work vehicle comprises communicating, by the computing system, with the first user computing device via an application operating on the first user computing device.

20. The method of claim 12, further comprising:

indicating, by the computing system, to the first operator that the first operator has access to the first work vehicle in response to granting the first operator the ability to access the first work vehicle; and indicating, by the computing system, to the first operator to that the first operator has access to the second work vehicle in response to granting the first operator the ability to access the second work vehicle.

* * * * *